US008900050B2

(12) United States Patent
Okada

(10) Patent No.: US 8,900,050 B2

(45) Date of Patent: Dec. 2, 2014

(54) GAMING MACHINE FOR EXECUTING BATTLE GAME BETWEEN GAMING TERMINALS

(75) Inventor: Kazuo Okada, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 736 days.

(21) Appl. No.: 13/151,997

(22) Filed: Jun. 2, 2011

(65) Prior Publication Data

US 2012/0309502 A1 Dec. 6, 2012

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC .................................. *G07F 17/3276* (2013.01)

USPC ............................................................ 463/25

(58) Field of Classification Search

CPC . G07F 17/3276; G07F 17/3223; G07F 17/32; G07F 17/3206; G07F 17/3211; A63F 9/00; A63F 9/0096; A63F 2250/027

USPC .................................... 463/16, 20, 25, 40, 42

See application file for complete search history.

(56) References Cited

U.S. PATENT DOCUMENTS

| | | | | |
|---|---|---|---|---|
| 6,364,765 B1 * | 4/2002 | Walker et al. | ................... | 463/16 |
| 2003/0100361 A1 * | 5/2003 | Sharpless et al. | ............... | 463/25 |
| 2005/0020340 A1 * | 1/2005 | Cannon | ........................... | 463/16 |

* cited by examiner

*Primary Examiner* — Adetokunbo O Torimiro

(74) *Attorney, Agent, or Firm* — KMF Patent Services, PLLC; S. Peter Konzel; Kenneth M. Fagin

(57) ABSTRACT

The present invention makes players willing to play games next to each other, so as to increase the use ratio. When a game result of a basic game corresponding to a payout occurs, a gaming machine determines whether a battle game condition related to the payout is at least satisfied, and when it is determined that the battle game condition is satisfied, adjacent gaming terminals are set as battle opponents. When battle opponents join the battle game, the battle game in which the battle opponents compete to win is executed, and the battle opponent winning the battle game obtains some profits.

11 Claims, 14 Drawing Sheets

GAMING MACHINE FOR EXECUTING BATTLE GAME BETWEEN GAMING TERMINALS

BACKGROUND OF THE INVENTION

1. Field of the Invention

The present invention relates to a gaming machine for executing a battle game between gaming terminals, and a game control method thereof.

2. Description of the Prior Art

In prior art, for gaming machines, a plurality of gaming terminals are usually arranged in a row. In addition to basic games, sometimes battle games are executed among the plurality of gaming terminals.

SUMMARY OF THE INVENTION

Currently, players at adjacent gaming terminals play next to each other. When playing a game at adjacent gaming terminals, players sometimes are distracted by the game conditions nearby, so many players are unwilling to play a game next to another player. Particularly, when a gaming terminal between gaming terminals that already give many payouts is vacant, in order not to be distracted by the gaming terminals next to it, players are strongly inclined to avoid playing games at the vacant gaming terminal. This leads to some gaming terminal easily remaining vacant, which is a problem because the use ratio of the gaming machines is thus low.

An objective of the present invention is to provide a gaming machine in a way that makes players want to play games next to each other to increase the use ratio and a game control method of the gaming machine.

Technical Means to Solve the Problem

The present invention provides a gaming machine, which includes: a basic game execution unit, for executing a basic game; a payout awarding unit, for awarding payouts on the basis of a game result of the basic game; a battle game condition determination unit, for determining whether a battle game condition related to the payout is at least satisfied when a game result of the basic game corresponding to the payout occurs; a battle opponent setting unit, for setting adjacent gaming terminals as battle opponents when it is determined that the battle game condition is satisfied; a battle game execution unit, for executing (automatically, or manually by a player) the battle game that the battle opponents compete to win when the battle opponents join in the battle game; and a profit obtaining unit, for obtaining some profits when a player wins the battle game that players join as battle opponents.

According to the present invention, in the gaming terminal where a game result corresponding to the payout occurs in a basic game, it is determined whether a battle game condition related to the payout is at least satisfied. When it is determined that the battle game condition is satisfied, adjacent gaming terminals are set as battle opponents. When the battle opponents join the battle game, the battle game is executed between the adjacent gaming terminals. When a player wins the battle game that players join as battle opponents, some profits can be obtained. Therefore, when the basic game is executed through adjacent gaming terminals, in a gaming terminal, some profits may be obtained through a battle game based on a game condition of the other gaming terminal, so the players are enthusiastic about playing the basic games at adjacent gaming terminals. As a result, the gaming terminals will unlikely stay vacant.

The battle game condition in the present invention is at least one of a condition based on a payout awarding amount, a condition based on an accumulated payout awarding amount, and a condition based on a balance amount obtained by subtracting a game fee required for executing the basic game from the payout awarding amount.

According to the present invention, as battle game conditions can be selected in free combinations from a plurality of conditions, the battle game frequency can be easily and freely set.

The present invention further includes a payout-awarding control unit, for controlling the payout awarding unit in such a way that, when a player loses the battle game, the payout-awarding control unit transfers a part of the payout to his/her battle opponent and awards him/her the remaining payout; the payout-awarding control unit may also enable the transferred part of the payout to be included in the profits.

According to the present invention, in the adjacent gaming terminals, even though the game result of the basic game not related to the payout continuously occurs, the profits including a part of the payout is also obtained for winning the battle game. Therefore, players are enthusiastic about playing the basic games at adjacent gaming terminals. As a result, the gaming terminals will unlikely stay vacant.

The payout-awarding control unit in the present invention may also receive a transferred predetermined battle participation fee from the battle opponent when winning in the battle game, and enable the battle participation fee to be included in the profits.

According to the present invention, as long as winning in the battle game, even the player who has been awarded the payout can still be transferred a battle participation fee from a losing battle opponent and be awarded the payout with the battle participation fee added, so both players at the adjacent gaming terminals have the possibility to obtain profits as long as they participate in the battle game as opponents and win.

The present invention may further include a battle game permitting unit, for randomly permitting and forbidding execution of the battle game by the battle game execution unit when the game result of the basic game corresponding to the payout occurs.

According to the present invention, when the game result of a special payout occurs, the players of the gaming terminals adjacent to the gaming terminal awarding the payout are made to wonder whether they can join the battle game so as to obtain a part of the special payout.

The present invention may also include a battle game rejecting unit for refusing to join the battle game through an external operation when being set as a battle opponent.

According to the present invention, the gaming machine can select whether to join in the battle game according to the intention of the player as a battle opponent, so the battle game between adjacent gaming terminals can be processed more freely.

The battle opponent setting unit in the present invention may also have a battle opponent resetting unit for resetting the battle opponent to a preprogrammed computer when the battle opponent does not join the battle game.

According to the present invention, even when the battle game at the adjacent gaming terminals is not implemented, the battle game with the computer as battle opponent can be executed, so as to keep the player interested.

The present invention provides a gaming machine, which includes a basic game execution unit, for executing a basic game; a payout awarding unit, for awarding a payout on the basis of a game result of the basic game; a battle game condition determination unit, for determining whether a battle game condition related to the payout is at least satisfied when a game result of the basic game corresponding to the payout occurs; a battle opponent setting unit, for setting gaming terminals capable of data communication as battle opponents when it is determined that the battle game condition is satisfied; a battle game execution unit, for executing the battle game in which the battle opponents compete to win when the battle opponents are set; and a profit obtaining unit, for obtaining some profits when a player wins the battle game that players join in as battle opponents.

According to the present invention, in a gaming terminal where a game result corresponding to the payout occurs in a basic game, it is determined whether a battle game condition related to the payout is at least satisfied. When it is determined that the battle game condition is satisfied, more than one gaming terminal capable of data communication is set as a battle opponent. Further, the battle game is executed between the gaming terminals. When a player wins the battle game that players join as battle opponents, some profits are obtained. Therefore, when the basic game is executed between the gaming terminals capable of data communication, even if the game result of the payout does not occur, the possibility of obtaining some profits through battle games still exists, so the players are enthusiastic about playing the basic games at adjacent gaming terminals capable of data communication.

The present invention provides a game control method of a gaming machine, which includes: executing a basic game; awarding a payout on the basis of a game result of the basic game; determining whether a battle game condition related to the payout is at least satisfied when a game result of the basic game corresponding to the payout occurs; setting adjacent gaming terminals as battle opponents when it is determined that the battle game condition is satisfied; executing the battle game that the battle opponents compete to win when the battle opponents join in the battle game; and obtaining some profits when a player wins the battle game that players join as battle opponents.

According to the present invention, in a gaming terminal that a game result corresponding to the payout occurs in a basic game, it is determined whether a battle game condition related to the payout is at least satisfied. When it is determined that the battle game condition is satisfied, adjacent gaming terminals are set as battle opponents. When the battle opponents join in the battle game, the battle game is executed between the adjacent gaming terminals. When a player wins the battle game that players join as battle opponents, some profits can be obtained. Therefore, when the basic game is executed between adjacent gaming terminals, in a gaming terminal, some profits may be obtained through a battle game based on a game condition of the other gaming terminal, so the players are enthusiastic about playing the basic games at adjacent gaming terminals. As a result, the gaming terminals will unlikely stay vacant.

Effect of the Invention

The present invention is to make players enthusiastic about playing games next to each other.

DETAILED DESCRIPTION (General Description of Gaming Machine)

The embodiments of the present invention are illustrated below with reference to the drawings.

Figure 1:
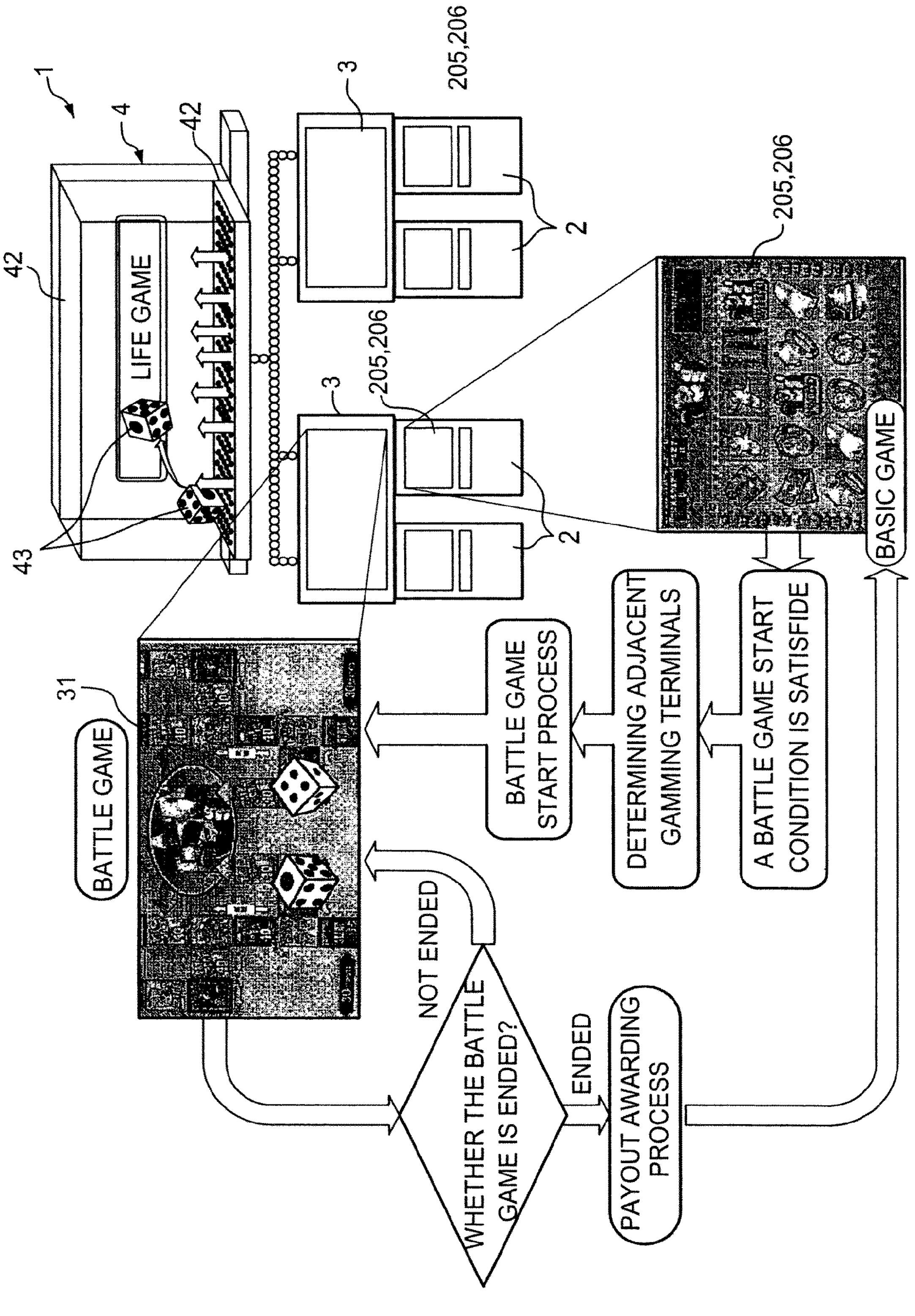
FIG. 1 is an explanatory diagram illustrating a gaming method of a gaming machine.

As shown in FIG. 1, in an embodiment, during execution of a basic game, if a battle game start condition is satisfied, the gaming machine 1 determines adjacent gaming terminals, i.e., slot machines 2, and executes a battle game start process. Further, the present invention is structured to make possible a battle game in which adjacent gaming terminals compete with each other to win, and the battle game is repeatedly executed until the battle game is won, and some profits are obtained by the winning slot machine 2. Although in this embodiment the slot machine 2 is described as a gaming terminal, the present invention is not limited thereto.

(General Description of Gaming Machine: Functional flow)

Figure 2:
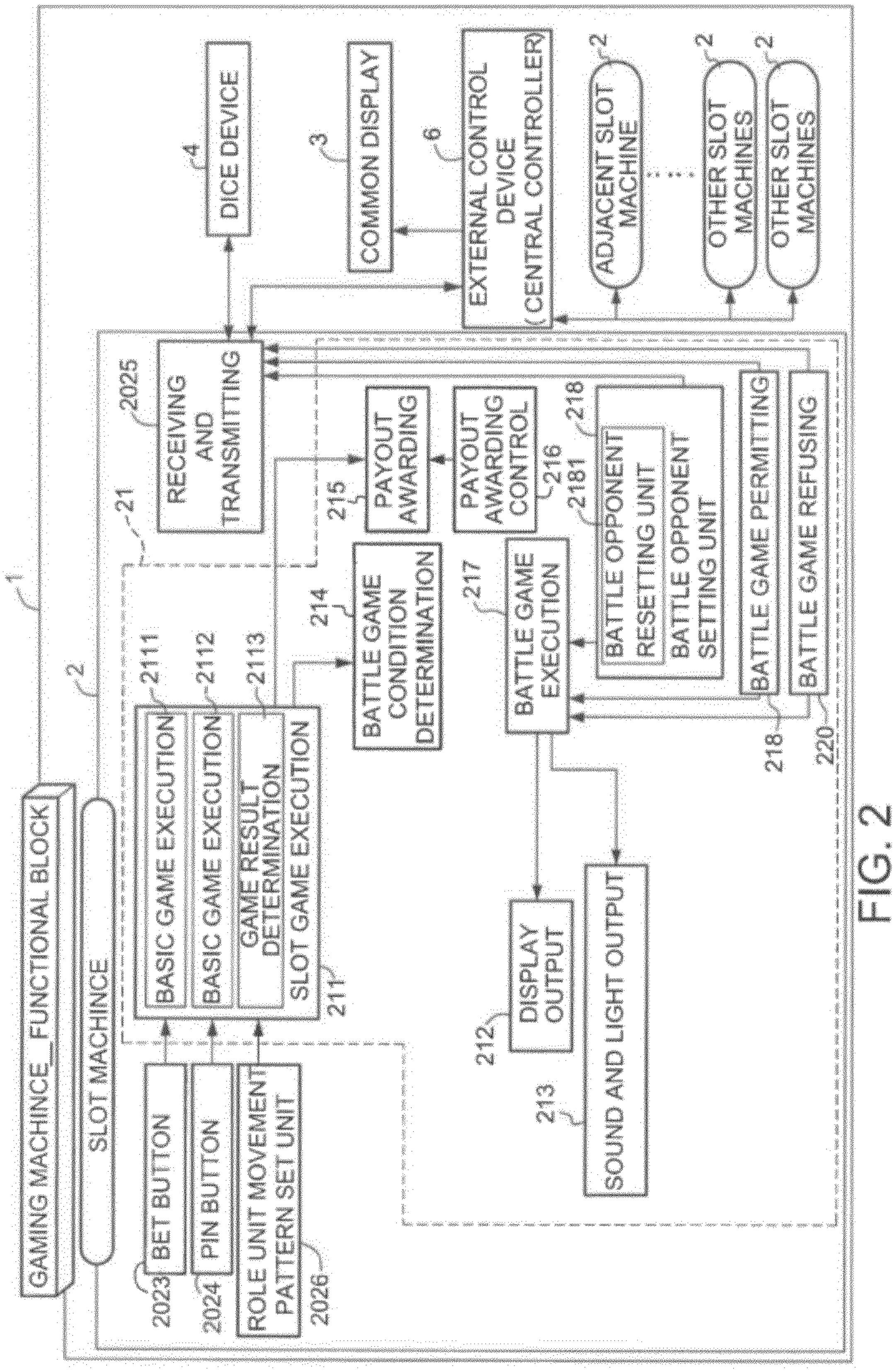
FIG. 2 is an explanatory diagram illustrating a functional flow of a gaming machine.

Specifically, as shown in FIG. 2, the gaming machine 1 is structured for multiple players, and multiple slot machines 2 are connected to a central controller 6 (external control device) in a manner capable of data communication therebetween, and the slot machines 2 are connected in a manner capable of data communication with each other. The central controller 6 has functions of remote operation and remote monitoring of processing such as modification of operation status of the slot machines 2 or various game setting values. Further, the gaming machine 1 can execute a basic game such as a slot game separately in each slot machine 2, and execute a battle game such as a life game at the same time between adjacent slot machines 2•2.

In addition, the connection between the slot machines 2 or the connection between the slot machines 2 and the central controller 6 can be either wired or wireless, and can also be a combination of wired and wireless connection. Also, in the slot game or battle game, a unit of a bet amount may be a national or regional currency such as the US dollar, the Japanese Yen and the Euro, or a game point passable only at a hall where the gaming machine 1 is installed or the industry related to the gaming machine 1.

Further, the gaming machine 1 includes a dice device 4 and a common display 3. The dice device 4 is structured to cast a physical dice 43 to make the physical dice 43 roll randomly, and is capable of telling the score of the dice 43 when it stops. One common display 3 is disposed for 2 slot machines 2•2 arranged in parallel. The detailed description of the dice device 4 and the common display 3 will be provided later.

The slot machine 2 includes a terminal controller 21, a BET button 2023 connected to the terminal controller 21, a spin button 2024, and a receiving and transmitting unit 2025. Further, the slot machine 2 has a sound and light output unit 213 and a display output unit 212. The sound and light output unit 213 has a function of driving a speaker or a lamp and the like to produce sound and/or light effects. The display output unit 212 serves to display a variety of display data on a display panel.

The terminal controller 21 includes a slot game execution unit 211. The slot game execution unit 211 has a basic game execution unit 2111 and a bonus game execution unit 2112. The basic game execution unit 2111 has a function of executing a basic game. The bonus game execution unit 2112 has a function of executing a bonus game.

Here, the "basic game" refers to a game executed with a bet of a game value as a condition and awarding game values of amounts corresponding to rearranged symbols 101. That is to say, the so-called "basic game" refers to a game which is executed on the premise of consuming game values. The so-called "bonus game" has the same meaning as a special game. The bonus game may also be any game provided that bonus game has an advantageous game status over the basic game. The so-called "rearrangement" refers to a state in which the symbols 101 are arranged again after the previous arrangement of the symbols 101 is dismissed. The so-called "arrangement" refers to a state in which the symbols 101 are allowed to be visible to a player.

Further, the terminal controller 21 includes: a payout awarding unit 215, for awarding a payout on the basis of a game result of the basic game; a battle game condition determination unit 214, for determining whether a battle game condition related to the payout is at least satisfied when a game result of the basic game corresponding to the payout occurs; a battle opponent setting unit 218, for setting adjacent slot machines 2 as battle opponents when it is determined that the battle game condition is satisfied; a battle game execution unit 217, for executing the battle game that the battle opponents compete to win when the battle opponents join in the battle game; and a profit obtaining unit 221, for obtaining some profits when a player wins the battle game that players join as battle opponents.

Accordingly, in a slot machine 2 where a game result corresponding to the payout occurs in a basic game, it is determined whether a battle game condition related to the payout is at least satisfied. When it is determined that the battle game condition is satisfied, adjacent slot machines 2 are set as battle opponents. When the battle opponents join in the battle game, the battle game is executed between the adjacent slot machines 2•2. When a player wins the battle game that players join as battle opponents, some profits can be obtained. Therefore, when the basic game is executed between the adjacent slot machines 2•2, in a slot machine 2, some profits may be obtained through a battle game based on a game condition of the other slot machine 2, so the players are enthusiastic about playing the basic games at adjacent slot machines 2•2. As a result, the slot machines 2 will unlikely stay vacant.

Here, the "battle game condition" can be at least one of a condition based on a payout awarding amount, a condition based on an accumulated payout awarding amount, and a condition based on a balance amount obtained by subtracting a game fee required for executing the basic game from the payout awarding amount. Further, the "battle game condition" can be any one of direct payouts and indirect payouts as long as it is at least related to the payout. For example, the "battle game condition" can also be a case of winning a bonus or a jackpot as a game result of a basic game. At this time, as the battle game conditions can be selected in free combinations from a plurality of conditions, the battle game frequency can be easily and freely set.

Further, the terminal controller 21 has a payout-awarding control unit 216 for transferring a part of the payout to the battle opponent and controlling the payout awarding unit 215 to award a remaining payout when losing in the battle game, in which the profit obtaining unit 221 has a function of enabling the transferred part of the payout to be included in the profits. Accordingly, for the gaming machine 1, in the adjacent slot machines 2•2, even if the game results of the basic game not related to the payout occur continuously, the profits including a part of the payout can be obtained for winning the battle game. Therefore, players are enthusiastic about playing the basic games at adjacent slot machines 2•2. As a result, the slot machines 2 will unlikely stay vacant.

Further, the payout-awarding control unit 216 in the terminal controller 21 has functions of receiving a transferred predetermined battle participation fee from the battle opponent when winning in the battle game and enabling the battle participation fee to be included in the profits. Accordingly, the gaming machine 1 is configured so that even though the players are awarded the payout, as long as winning in the battle game, can still be transferred a battle participation fee from a losing battle opponent, and receive the payout with the battle participation fee added, so both players at the adjacent slot machines 2•2 have the possibility to obtain profits as long as they participate in the battle game as opponents and win.

Further, the terminal controller 21 has a battle game permitting unit 219, for randomly permitting or forbidding execution of the battle game by the battle game execution unit 217 when the game result of the basic game corresponding to the payout occurs. Accordingly, when the game result of the special payout occurs, the gaming machine 1 can make the players of the slot machines 2 next to the slot machine 2 making the payout wonder whether they can join the battle game so as to obtain a part of the special payout.

Further, the terminal controller 21 has a battle game rejecting unit 220 for refusing to join the battle game through an external operation when being set as a battle opponent. Accordingly, the gaming machine 1 can select whether to join the battle game according to the intention of the player as a battle opponent, so the battle game between adjacent slot machines 2•2 can be processed more freely.

Further, the battle opponent setting unit 218 in the terminal controller 21 has a battle opponent resetting unit 2181 for resetting the battle opponent to a preprogrammed computer when the battle opponent does not join the battle game. Accordingly, in the gaming machine 1, even when the battle game with the adjacent slot machines 2 is not implemented, the battle game with a computer as the battle opponent of can be executed, so as to keep the player interested.

The functional blocks of the terminal controller 21 having such a structure are implemented through information processing devices including an operation unit, a memory unit or an interface unit mounted on the circuit board. Accordingly, the terminal controller 21 has a structure programmed in a manner to execute a variety of function processes. That is to say, the terminal controller 21 of the slot machine 2 is programmed in a manner to perform the processes in Steps (a1) to (a6), so as to have the battle game executed on the adjacent slot machines 2•2. That is to say, the slot machine 2 comprises the terminal controller 21 which have the battle game executed on the adjacent slot machines 2•2. Accordingly, the slot machine 2 implements a game control method in which Steps (a1) to (a6) are performed.

In Step (a1), a basic game is executed. In Step (a2), a payout is awarded based on a game result of the basic game. In Step (a3), when a game result of the basic game corresponding to the payout occurs, it is determined whether a battle game condition related to the payout is at least satisfied. In Step (a4), when it is determined that the battle game condition is satisfied, adjacent slot machines 2 (gaming terminals) are set as battle opponents. In Step (a5), when the battle opponents join the battle game, the battle game in which the battle opponents compete to win is executed. In Step (a6), when a player wins the battle game that players join as battle opponents, some profits are obtained.

(Mechanical Structure of Slot Machine 2)

Figure 3:
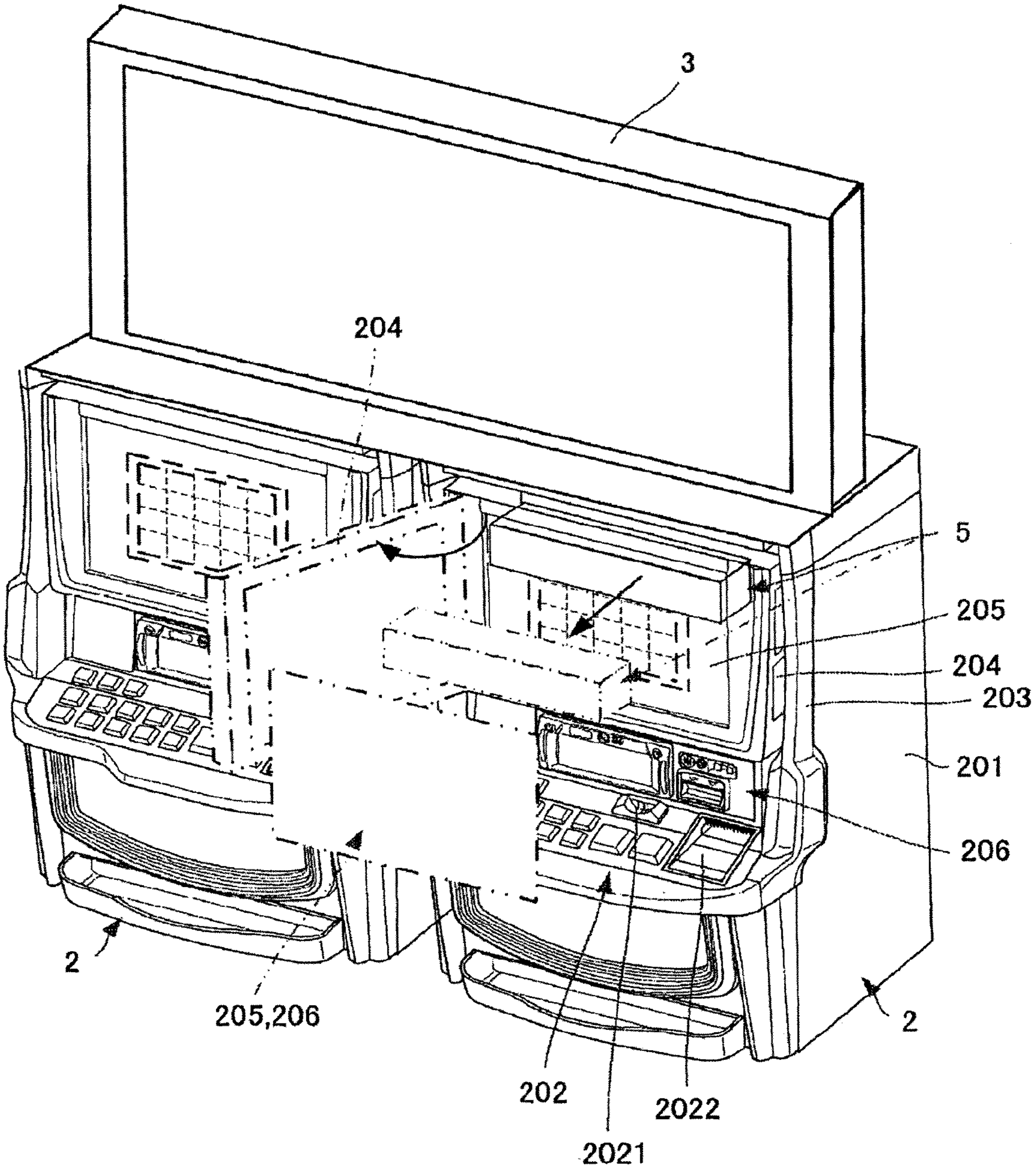
FIG. 3 is a schematic view illustrating functional flow of a gaming machine.

A slot machine 2 having a variety of the functions, as shown in FIG. 3, includes a cabinet 201, a main door 203 provided to a front of the cabinet 201, and a display door 204 disposed at an upper part of the main door 203. The display door 204 is provided with a symbol display device 205. The symbol display device 205 comprises a transparent liquid crystal panel capable of changing all or any part thereof into a transparent state.

Figure 4:
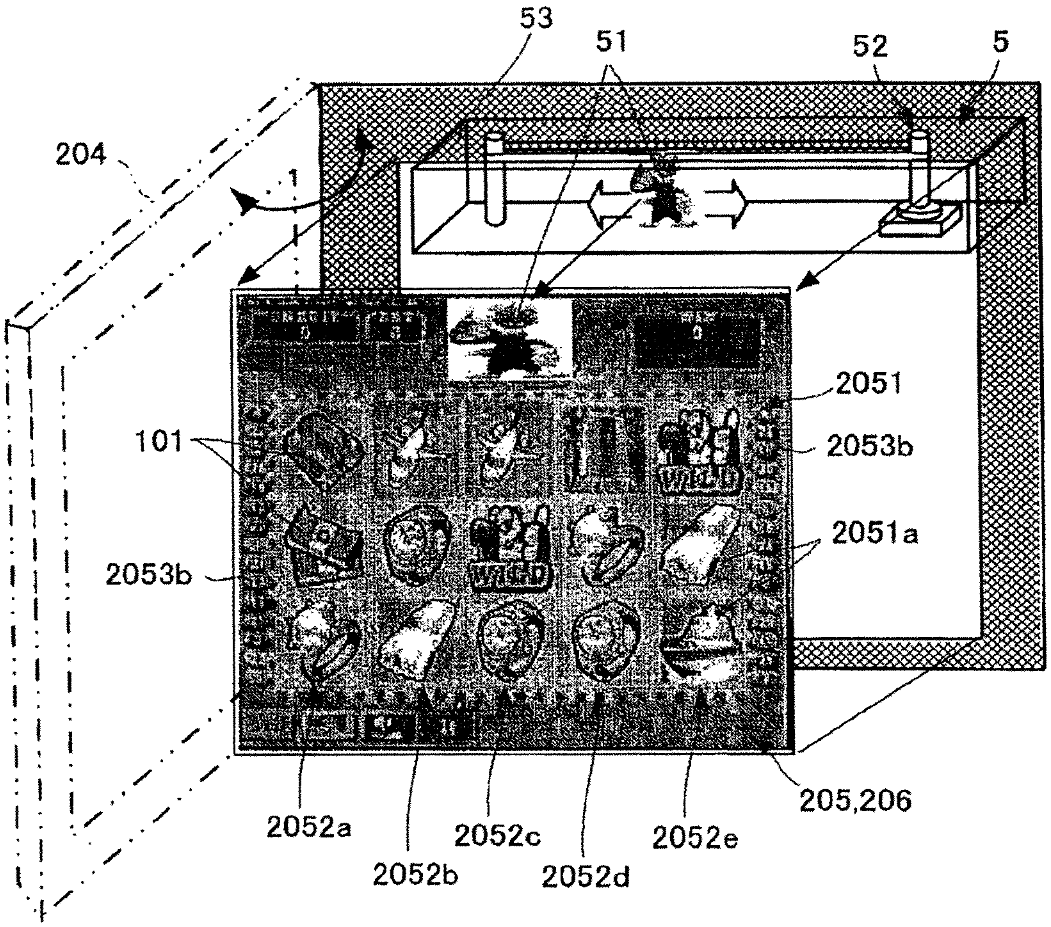
FIG. 4 is a schematic structural view of a symbol display device.

The symbol display device 205, as shown in FIG. 4, has a display window 2051 at a central part. The display window 2051 is formed of 15 display blocks 2051*a* in 5 columns and 3 rows. 3 display blocks 2051*a* in each column form virtual reels 2052*a* to 2052*e*. The virtual reels 2052*a* to 2052*e* can be rearranged as follows: the 3 display blocks 2051*a* are enabled to integrally change speeds while moving downward to be displayed, so the symbols 101 displayed in all display blocks 2051*a* stop after spinning in a vertical direction.

Further, pay line generation columns 2053*a*•2053*b* are symmetrically arranged at the left side and the right side of the display window 2051. The pay line generation columns 2053*a*•2053*b* at the two sides each have a plurality of pay line generation units. The pay line generation units at each side may together form an activated pay line. The pay lines are activated by connecting the pay line generation units at the two sides. Otherwise, the pay lines are inactived. The number of paylines L to be activated is determined based on a bet amount. In such a case where a MAXBET indicating the maximum amount of bet allowed, the maximum number of paylines L are activated. Various winning combinations of symbols 501 are formed along activated paylines L.

On the front of the symbol display device 205, a touch panel 206 is provided. A player can input a variety of operation data through the touch panel 206. As shown in FIG. 3, below the symbol display device 205, a PTS terminal 206 and a control panel 202 are arranged in sequence.

The PTS terminal 206 is a unit comprising an LCD 2061, a microphone, or a human detection camera, and includes various devices having a microphone function or a camera function, a speaker function, and a display function. The PTS terminal 206 can receive and transmit various game related data such as credit data through mutual communication with the terminal controller 21 and a management server, which is not shown. Further, the control panel 202 has various buttons such as the BET button 2023 in FIG. 2, and has a coin insertion slot 2021 for inserting a coin into the cabinet 201 or a bill insertion slot 2022 for inserting a bill.

(Role Unit 5)

Further, a role unit 5 is disposed at a rear side of the symbol display device 205 (an internal side of the cabinet 201). As shown in FIG. 4, the role unit 5 includes visible objects 51 such as three-dimensional dummies or dolls, a movement mechanism 52 making the visible objects 51 to move left and right, and an accommodation body 53 for supporting the visible objects 51 and the movement mechanism 52 and having an opening in front. Accordingly, the visible object 51 can be seen from outside through a transparent part of the symbol display device 205.

(Common Display 3)

Figure 5:
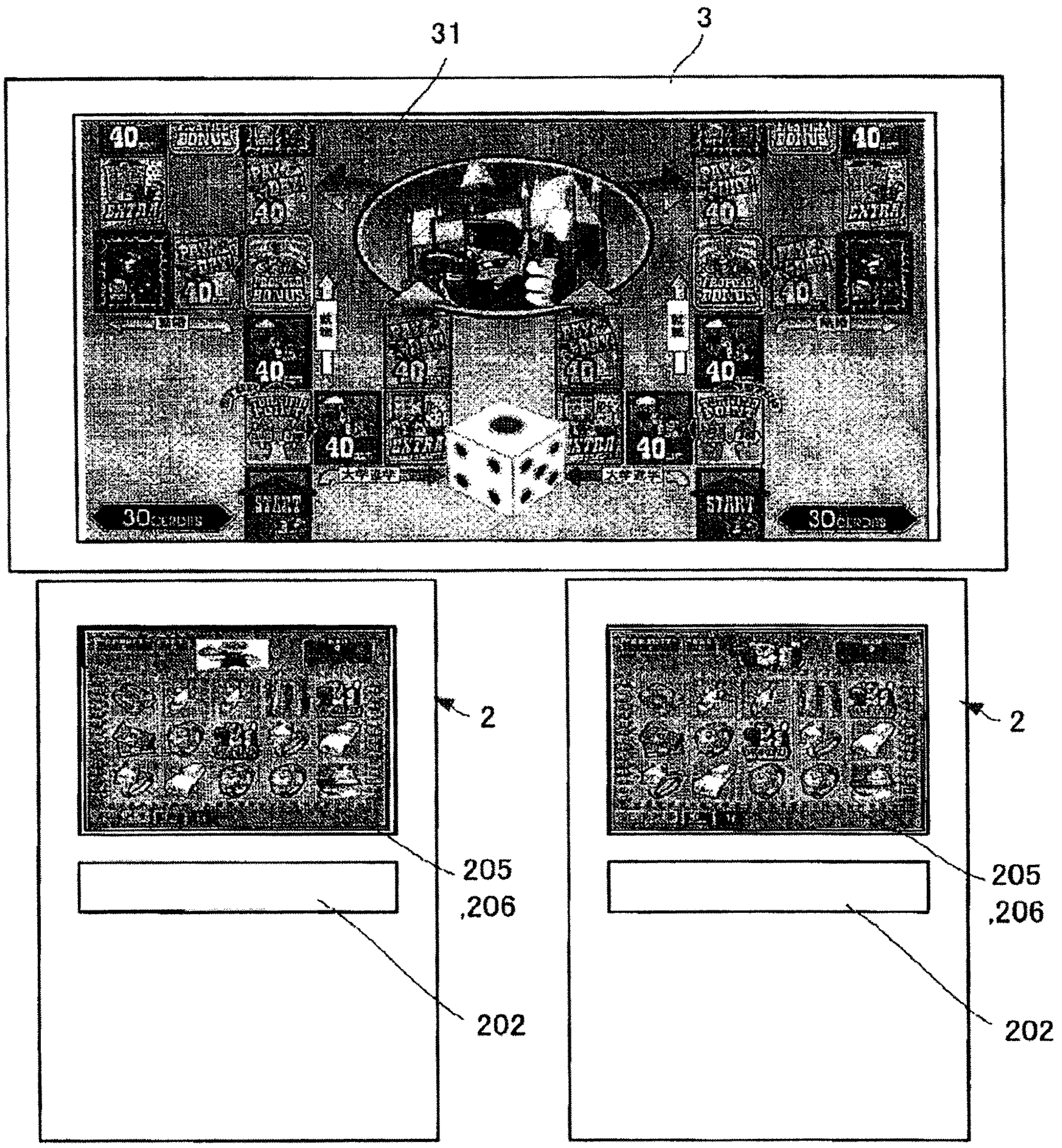
FIG. 5 is a schematic structural front view of a gaming machine.

As shown in FIG. 5, two slot machines 2 are arranged in a parallel state. Above the slot machines 2•2, a common display 3 is provided. The common display 3 comprises a display device such as a liquid crystal display panel, and can display a battle game picture 31. The battle game is, for example, a life game, and a starting position of a game character is set near a top end of each slot machine 2, and a travel route is formed from the starting position to a destination.

The travel route has a plurality of processing units and branch units where the game character travels and stops according to the dice score. The processing unit is set to perform various operations or processing. The branch unit is a unit that divides the travel route into a plurality of parts, for example, the branch direction is determined on the basis of the dice score. Further, the slot machine 2 with the game character first arriving at the destination wins, and the other slot machine 2 loses.

(Dice Device 4)

Figure 6:
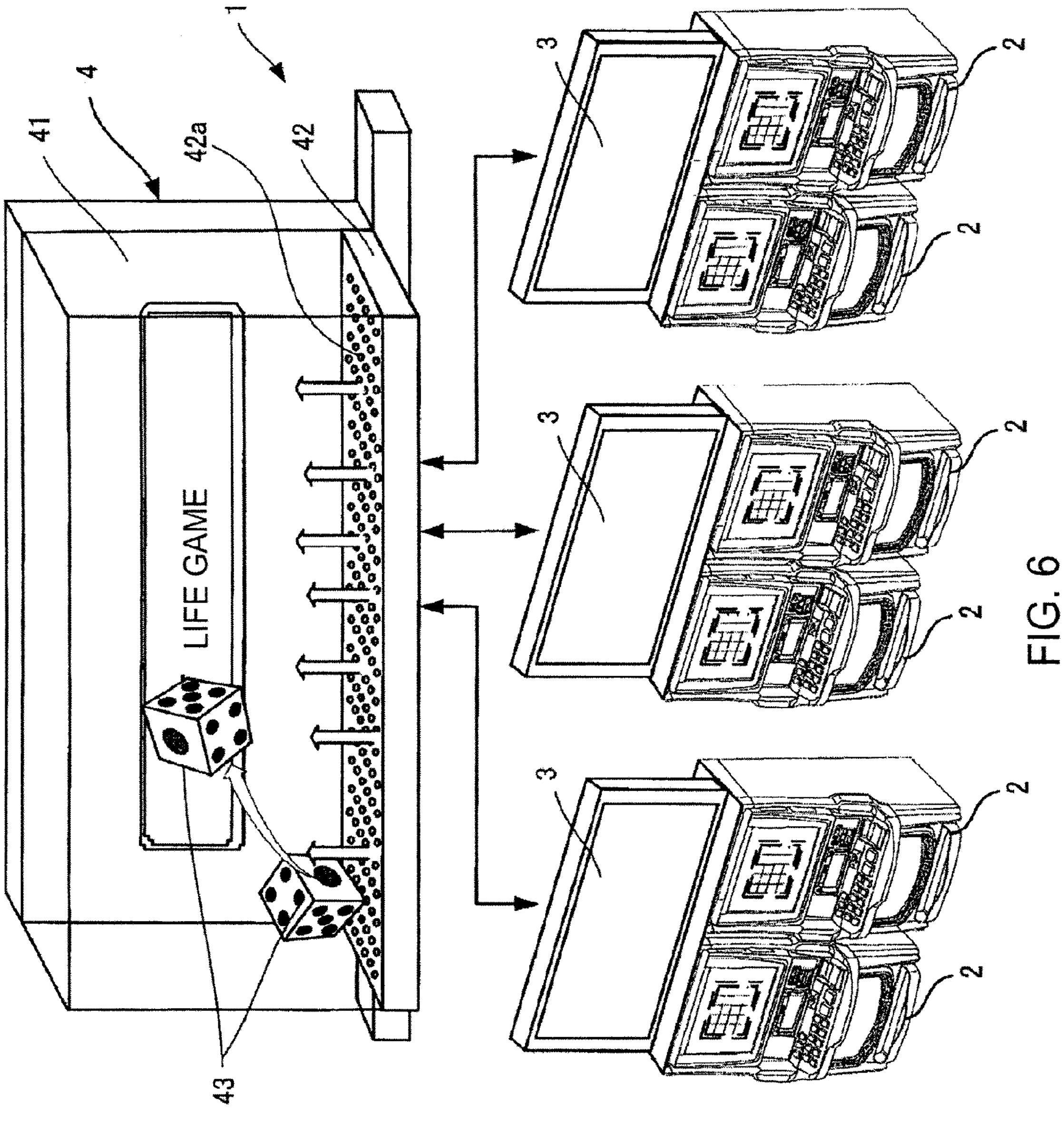
FIG. 6 is a perspective view of a gaming machine.

The score of the dice is randomly determined in the dice device 4. The random determination can also be performed through a program in the computer. As shown in FIG. 6, the dice device 4 is provided at a position that can be seen from both slot machines 2. The dice device 4 includes a dice accommodation body 41 formed of a transparent material, an air jet board 42 provided at a bottom surface of the dice accommodation body 41, and a dice 43 accommodated inside the dice accommodation body 41. A large amount of air jet holes 42*a* are opened on the air jet board 42, and when it is set to randomly determine the dice score, air is jetted within a predetermined time.

Further, the dice 43 is set to such a weight and size that the dice 43 can be cast by the air jetted from the air jet board 42. For example, the dice 43 is formed of foamed styrene. A camera (not shown) for shooting the dice 43 is provided above the dice accommodation body 41. The shooting data of the camera is used for determining the dice score, and the determined dice score is displayed on the common display 3 corresponding to the slot machines 2•2 in the battle game.

(Operation of Slot Machine 2: Basic Game Execution Process)

Figure 8:
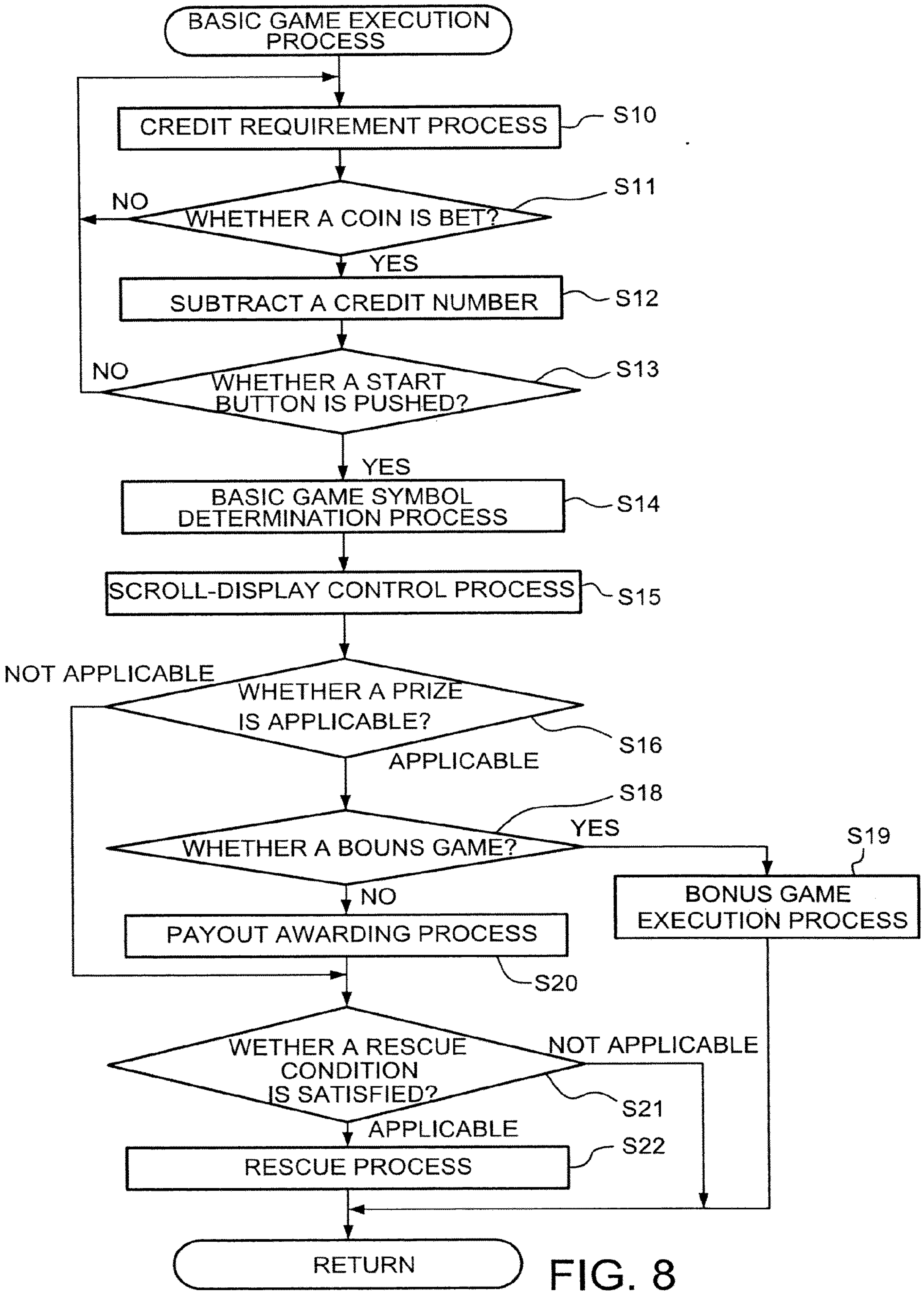
FIG. 8 is a flowchart illustrating an execution process of a basic game.

According to the present invention, if a basic game execution process routine is executed in the terminal controller 21 of the slot machine 2, as shown in FIG. 8, after a credit requirement process is executed (S10), it is determined whether a coin is bet (S11). When the coin is not bet (S11, NO), S10 is re-executed. When the coin is bet (S11, YES), after the credit number is subtracted (S12), it is determined whether a start button is pushed through a push operation (S13).

When the start button is not pushed (S13, NO), S10 is re-executed. When the start button is pushed (S13, YES), a basic game symbol determination process is executed (S14). Subsequently, a scroll-display control process is executed, and after the symbols 101 start scrolling, the display control is implemented (S15) to rearrange the symbols 101 determined in S14.

Next, it is determined whether a prize is applicable (S16). When the prize is not applicable (S16, NO (not applicable)), it is determined whether a rescue condition in which the basic game is repeated for more than a predetermined number of times is satisfied (S21). When the rescue start condition is not satisfied (S21, NO (not satisfied)), the routine is ended. When the rescue start condition is satisfied (S21, YES (satisfied)), a rescue process of awarding a predetermined payout is performed (S22), and then the routine is ended.

Further, when the prize is applicable in S16 (S16, YES (applicable)), it is determined whether the prize is a bonus game (S18). When the prize is a bonus game (S18, YES), a bonus game execution process is executed, so the process is shifted from the basic game to the bonus game (S19). Subsequently, when the bonus game is ended, the routine is ended. When the prize is not a bonus game (S18, NO), a payout awarding process is executed, so a payout corresponding to the prize is awarded (S20). Next, it is determined whether a rescue condition is satisfied (S21), and if the rescue condition is satisfied (S21, YES), the rescue process is executed (S22), and then the routine is ended.

(Battle Game Condition Determination Process)

Figure 9:
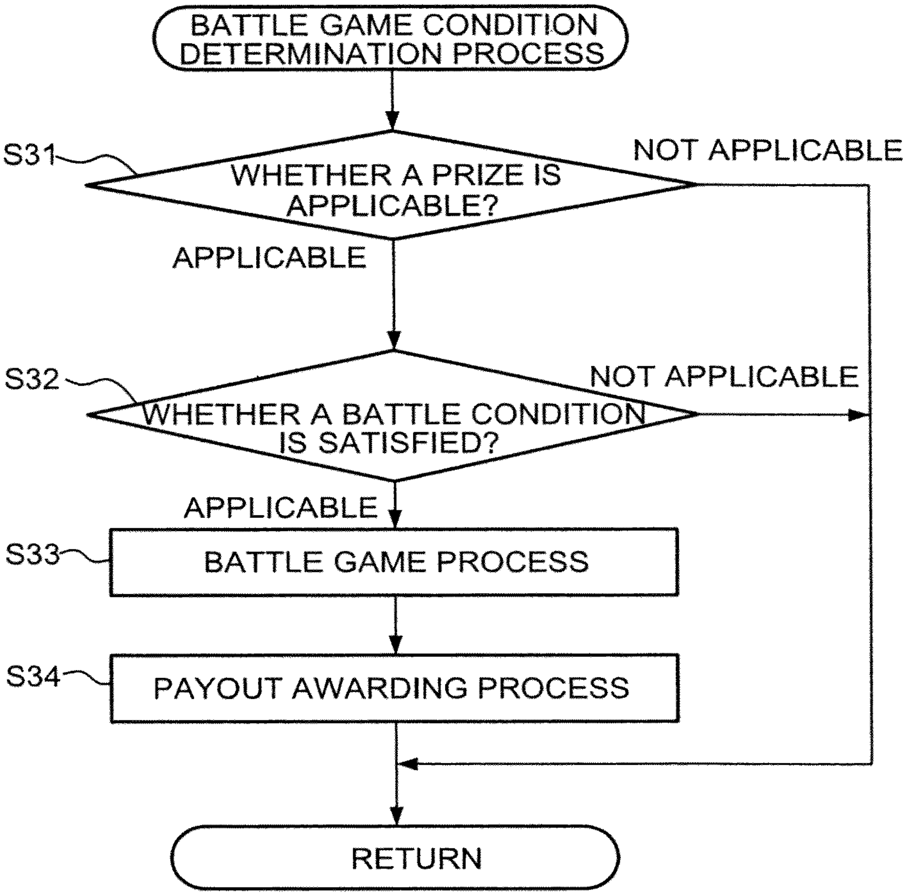
FIG. 9 is a flowchart illustrating a battle game condition determination process.

When the basic game execution process is executed in the above manners, as shown in FIG. 9, a battle game determination process is executed in a separate and parallel manner. In the battle game condition determination process, it is determined whether a prize is applicable in the basic game process (S31). If the prize is not applicable (S32, NO (not applicable)), the routine is ended to repeat S31.

When the prize is applicable (S31, YES (applicable)), it is determined whether a battle game condition is satisfied (S32). When the battle game condition is not satisfied (S32, NO (not satisfied)), the routine is ended to repeat S31. When the battle game condition is satisfied (S32, YES (satisfied)), a battle game process is executed (S33). Further, a payout awarding process is executed, so the payout is awarded on the basis of the game result in the battle game process (S34), and then the routine is ended.

(Battle Game Process)

Figure 10:
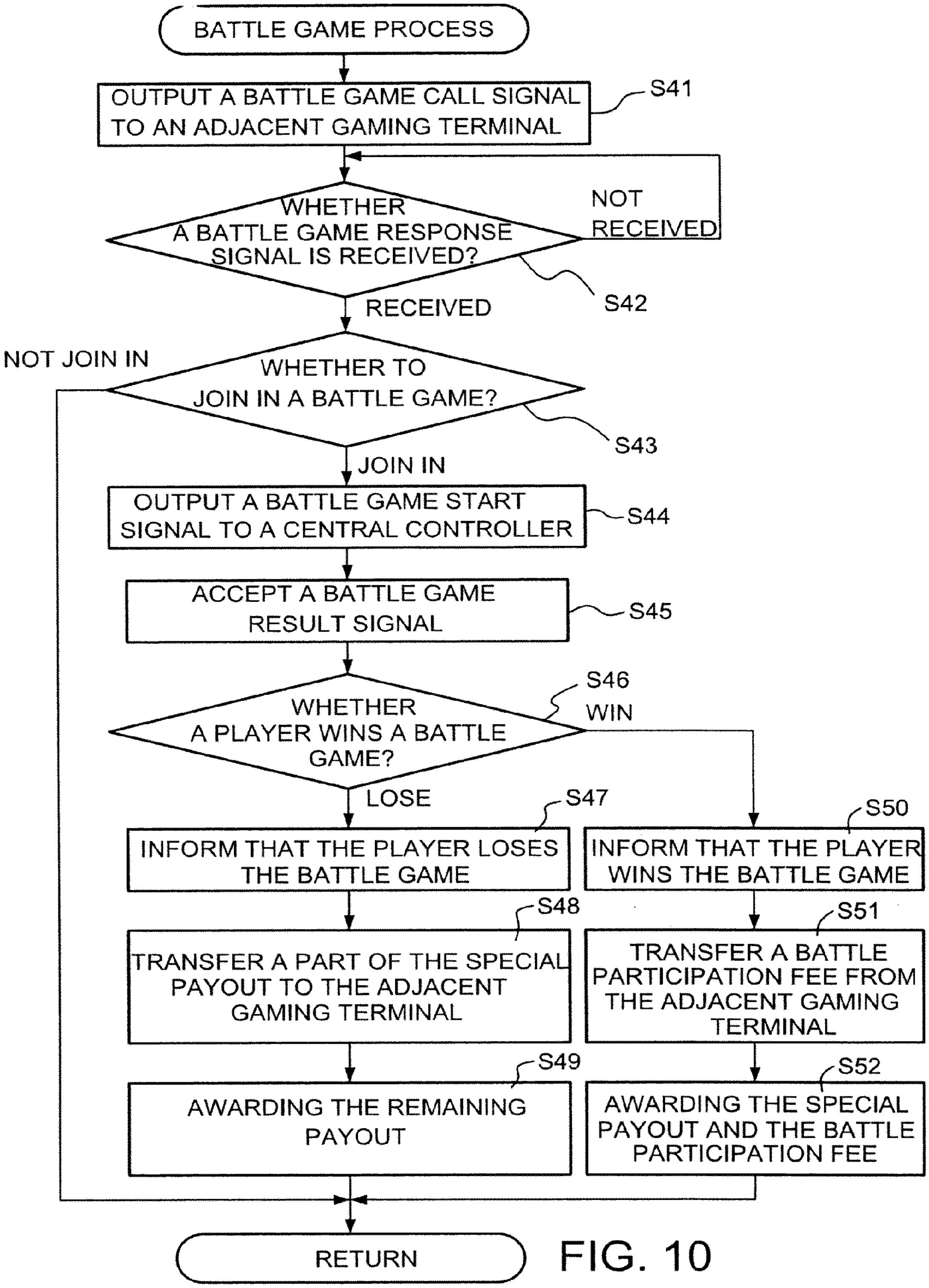
FIG. 10 is a flowchart illustrating a battle game process.

In the battle game condition determination process, if the battle game process is executed (S33), as shown in FIG. 10, first, a battle game call signal is outputted to the adjacent gaming terminal, i.e., the slot machine 2 (S41). Subsequently, it is determined whether a battle game response signal is received (S42), and if the battle game response signal is not received (S42, NO (not received)), S42 is repeated. When the battle game response signal is received (S42, YES (received)), whether to join in the battle game is determined on the basis of the battle game response signal (S43).

When data representing "join battle" is not included in the battle game response signal (S43, NO (not join)), the routine is ended. In addition, when the battle game cannot be executed through the adjacent slot machines 2•2, a battle program in the central controller 6 can be selected as a battle opponent automatically or by a player to execute the battle game.

In contrast, when the data representing "join battle" is included in the battle game response signal (S44, YES (join)), a battle game start signal is outputted to the central controller 6 (S44). Accordingly, a server side battle game process is executed through the central controller 6, and the battle game (life game) is executed between the adjacent slot machines 2•2. Subsequently, when the battle game is ended, a battle game result signal is outputted to the two slot machines 2•2 from the central controller 6.

During the execution of the battle game, the battle game result signal transmitted by the central controller 6 is accepted (S45). If the battle game result signal is received, it is determined whether a player wins the battle game (S46) on the basis of the battle game result data included in the battle game result signal. When a player loses the battle game (S46), the player is informed that he/she loses through image display, voice output, and light output (S47). Subsequently, a part of the special payout is transferred to the adjacent slot machine 2 (S48). For example, if a prize in which the battle game condition is a bonus game is applicable, the payout according to the result of the bonus game execution is used as the special payout, and a part of the special payout of the bonus game is transferred. Further, for example, if a prize in which the battle game condition is jackpot is applicable, the payout in the jackpot is used as the special payout, and a part of the special payout of the jackpot is transferred. In addition, the special payout can also be a preset payout, so as to enable the battle game condition to be satisfied. Next, after the remaining special payout is awarded (S49), the routine is ended.

In S46, when a player wins the battle game (S46, YES (win)), the player is informed that he/she wins (S50). After a battle participation fee is transferred from the adjacent slot machine 2 (S51), the special payout and the battle participation fee are awarded (S52), and the routine is ended.

(Battle Game Response Process)

Figure 11:
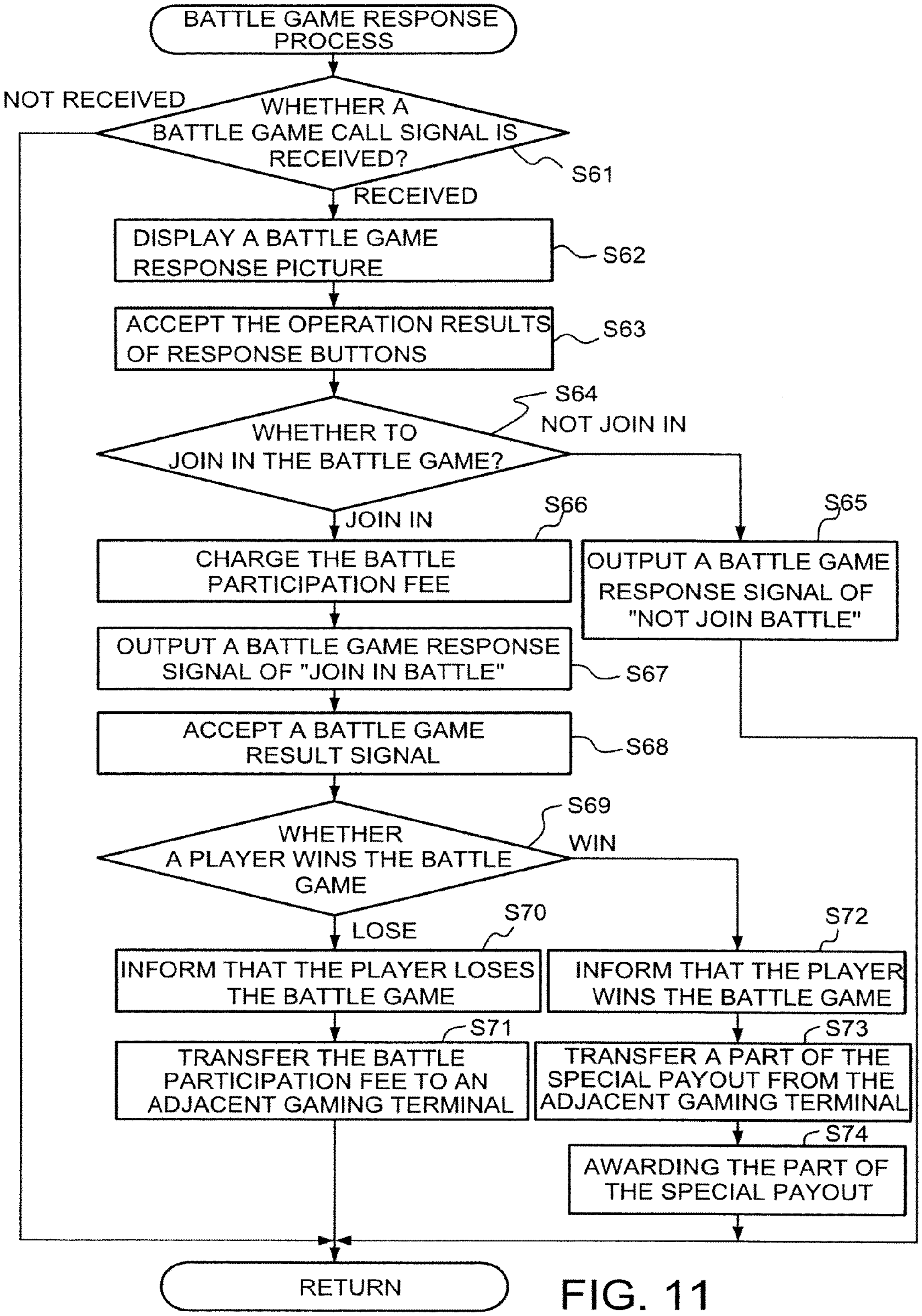
FIG. 11 is a flowchart illustrating a battle game response process.

The terminal controller 21, as shown in FIG. 11, executes a battle game response process and the battle game process in a separate and parallel manner. First, it is determined whether a battle game call signal is received (S61), and when the battle game call signal is not received (S61, NO (not received)), the routine is ended to enter a state of waiting for receiving the battle game call signal in S61.

Figure 7:
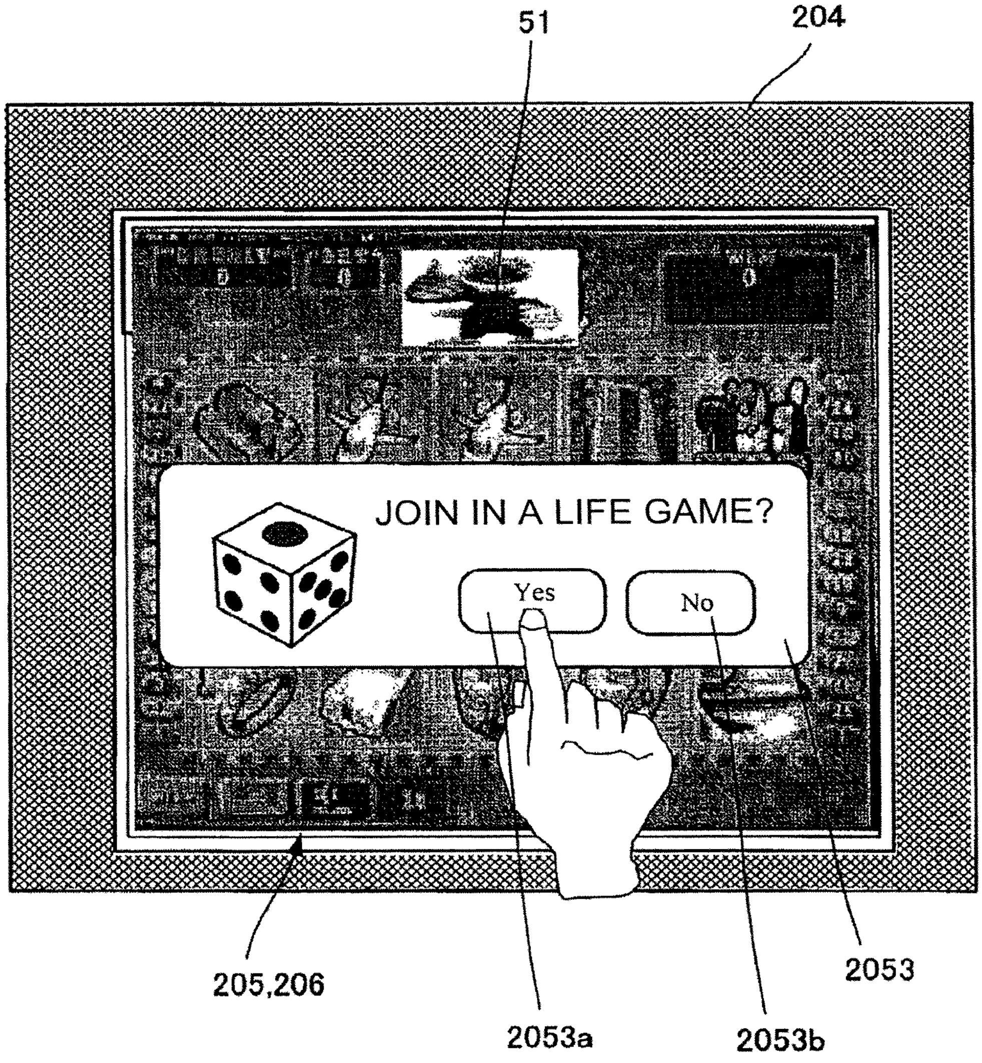
FIG. 7 is a schematic view of a battle game response picture.

In contrast, when the battle game call signal is received (S61, YES (received)), as shown in FIG. 7, a battle game response picture 2053 having "YES" and "NO" response buttons 2053*a*•2053*b* is displayed (S62). Subsequently, an operation acceptance state of the response buttons 2053*a*•2053*b* is entered, and accordingly a standby state is entered, until the response buttons 2053*a*•2053*b* are pushed by the player (S63).

If the response buttons 2053*a*•2053*b* are operated, it is determined whether the player is joining the battle game (S64). When it is determined that the player is not joining the battle game as the "NO" response button 2053*b* (S64, NO (not join in)) is pushed, the battle game response signal of "not join battle" is outputted to the adjacent slot machine 2 (S65). Subsequently, the routine is ended.

When it is determined that the player is joining the battle game as the "YES" response button 2053*a* (S64, YES (join in)) is pushed, the battle participation fee (S66) is charged. Subsequently, the battle game response signal of "join battle" is outputted to the adjacent slot machine 2 (S67). Accordingly, the battle game is started through the adjacent slot machines 2•2.

Next, the battle game result signal is accepted (S68). If the battle game result signal from the central controller 6 is received as the battle game is ended, it is determined whether the player wins the battle game on the basis of the battle game result signal (S69). If the player does not win the battle game (S69, NO (not win)), the player is informed that he/she loses (S70). Subsequently, the battle participation fee is transferred to the adjacent slot machine 2 (S71), and the routine is ended.

In contrast, when the player wins the battle game (S69, YES (win)), the player is informed that he/she wins (S72). Subsequently, a part of the special payout is transferred from the adjacent slot machine 2 (S73), the part of the special payout is awarded (S74), and the routine is ended.

(Server Side Battle Game Process)

Figure 12:
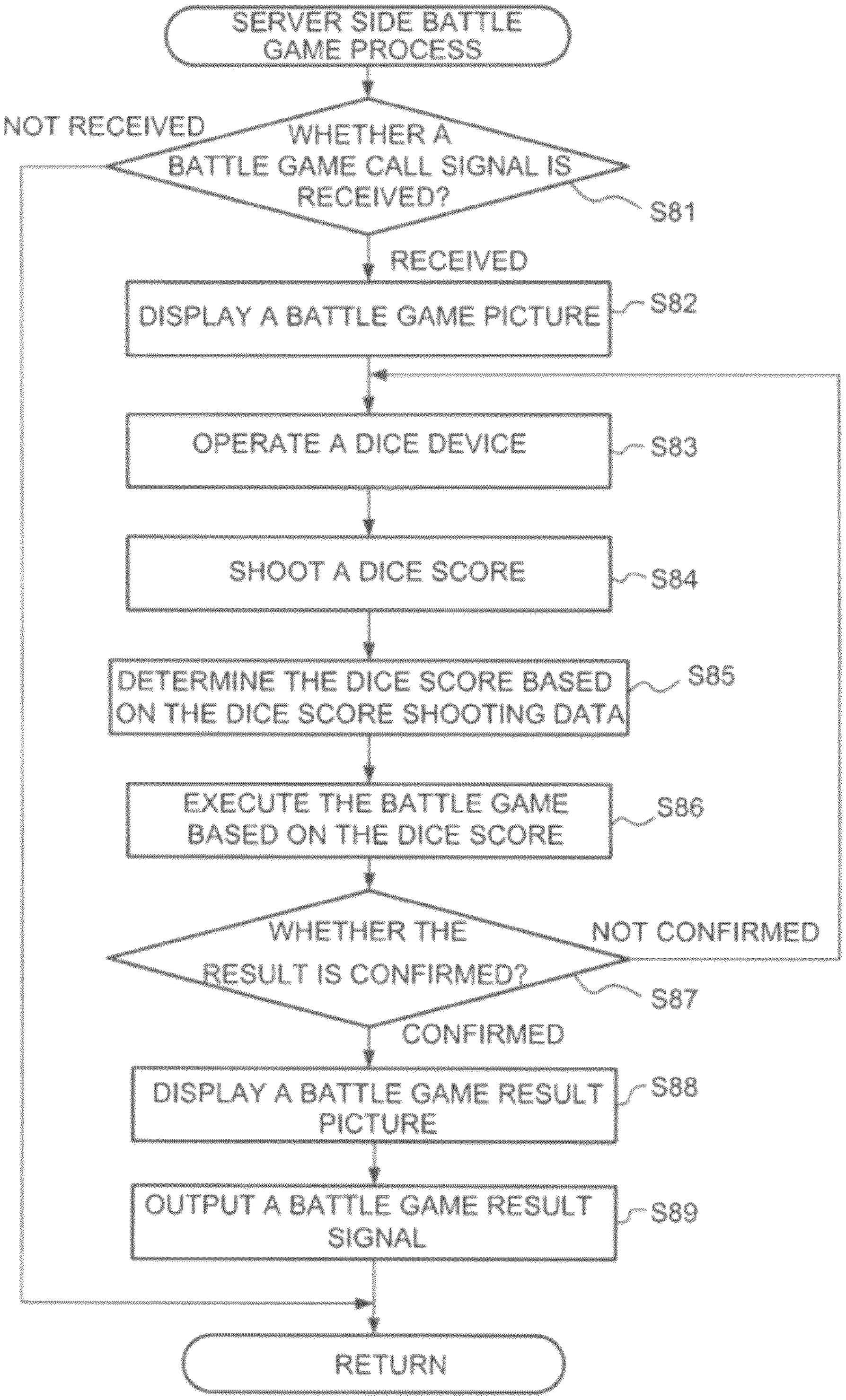
FIG. 12 is a flowchart illustrating a server side battle game process.

Further, in the central controller 6, as shown in FIG. 12, the server side battle game process is executed. First, it is determined whether the battle game start signal is received (S81). If the battle game start signal is not received (S81, NO (not received)), the routine is ended to enter an acceptance state of the battle game start signal due to re-execution of S81.

When the battle game start signal is received, a battle game picture is displayed in the common display 3 (S82). Next, by operating the dice device 4, the dice 43 in the dice device 4 is randomly rolled (S83). In the rolling process and the stopping process of the dice 43, the dice 43 is shot, and the dice point shooting data is outputted (S84). Based on the dice point shooting data of the dice 43 when it stops, the dice score is determined (S85). The battle game is executed on the basis of the dice score (S86).

Next, it is determined whether the result of the battle game is confirmed (S87). If the result is not confirmed (S87, NO (not confirmed)), S83 is re-executed. When the result is confirmed (S87, YES (confirmed)), a battle game result picture showing which one of the slot machines 2•2 wins is displayed (S88). Next, the battle game result signal is outputted (S89), and the routine is ended.

Although the embodiment of the present invention is illustrated, the embodiment is only exemplary, and not intended to limit the present invention, and changes can be made to the specific structures of various measures. Specifically, in this embodiment, as shown in FIG. 1, 2 slot machines 2•2 arranged in parallel and a common display 3 for the slot machines 2•2 are included, and the present invention is structured to execute the battle game between the adjacent slot machines 2•2; however, the present invention is not limited thereto.

Figure 13:
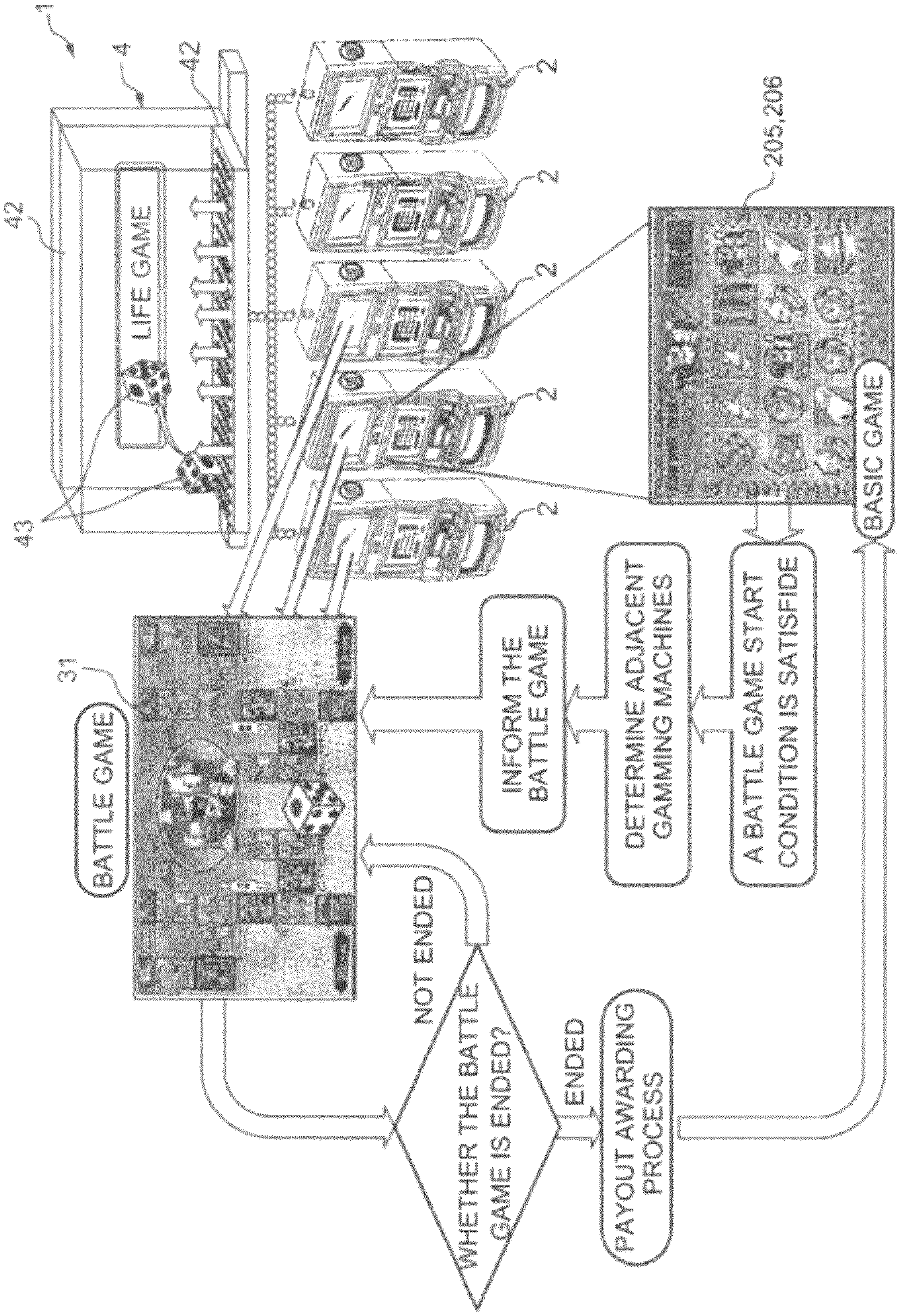
FIG. 13 is a schematic view illustrating a gaming method of a gaming machine.

For example, the gaming machine 1, as shown in FIG. 13, can also be structured to include more than 3 slot machines 2 arranged in parallel. At this time, even for the slot machine 2 sandwiched between the slot machines 2•2, the player is willing to play the basic game due to the possibility of the battle game.

Figure 14:
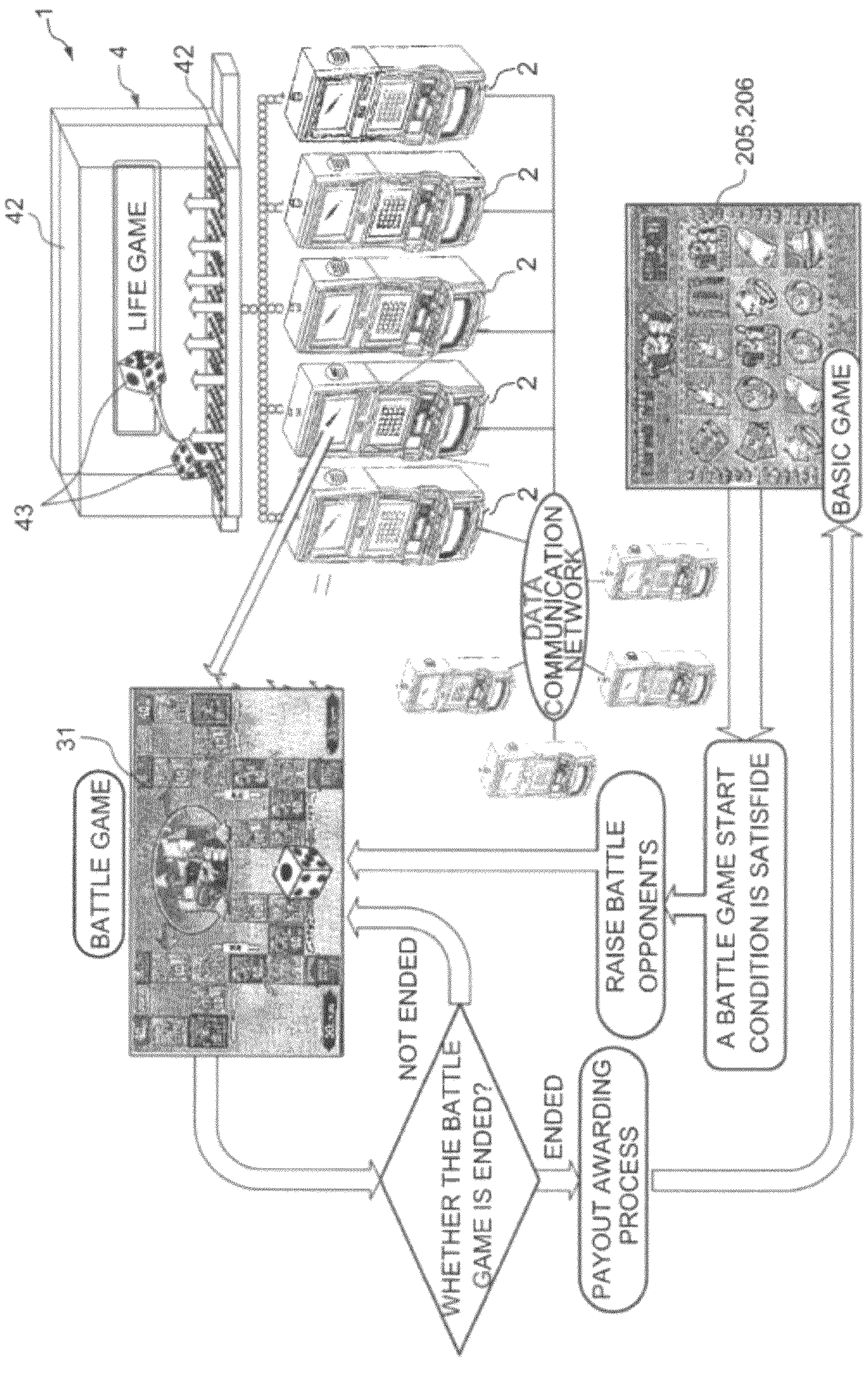
FIG. 14 is a schematic view illustrating a gaming method of a gaming machine.

Further, the gaming machine 1, as shown in FIG. 14, can also be structured to include a plurality of slot machines connected in a manner of being capable of data communication with each other, and the battle game can be executed among the slot machine 2 that satisfies a battle game condition, and more than one slot machine 2 as battle opponents. That is to say, the gaming machine 1 can be structured so that in the battle opponent setting unit 218 in FIG. 2, when it is determined that the battle game condition is satisfied, gaming terminals capable of data communication are set as battle opponents.

According to the present invention, in a slot machine 2 where a game result corresponding to the payout occurs in a basic game, it is determined whether a battle game condition related to the payout is at least satisfied. When it is determined that the battle game condition is satisfied, more than one slot machine 2 capable of data communication is set as battle opponents. Further, the battle game is executed between the slot machines 2. When a player wins the battle game that players join as battle opponents, some profits can be obtained. Therefore, when the basic game is executed between the gaming terminals capable of data communication, even if the game result of the payout does not occur, the possibility of obtaining some profits through battle games still exists, so the players are enthusiastic about playing the basic games at adjacent gaming terminals capable of data communication.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

LIST OF REFERENCE NUMERALS

1 Gaming machine
2 Slot machine
3 Common display
4 Dice device
5 Role unit
6 Central controller
21 Terminal controller

I claim:

1. A gaming machine, comprising:

a basic game execution unit, for executing a basic game;

a payout awarding unit, for awarding a payout on the basis of a game result of the basic game;

a battle game condition determination unit, for determining whether a battle game condition related to the payout is at least satisfied when a game result of the basic game corresponding to the payout occurs;

a battle opponent setting unit, for setting adjacent gaming terminals as battle opponents when it is determined that the battle game condition is satisfied;

a battle game execution unit, for executing a battle game in which the battle opponents compete to win when the battle opponents join the battle game;

a profit obtaining unit, for obtaining some profits when winning in the battle game that players join in as the battle opponents; and a payout-awarding control unit, for controlling the payout awarding unit in such a way that, when a player loses the battle game, the payout-awarding control unit transfers a part of the payout to a battle opponent and awards the player losing the battle game the remaining payout, wherein the profit obtaining unit enables the transferred part of the payout to be included in the some of the profits.

2. The gaming machine according to claim 1, wherein, the battle game condition is at least one of a condition based on a payout awarding amount, a condition based on an accumulated payout awarding amount, and a condition based on a balance amount obtained by subtracting a game fee required for executing the basic game from the payout awarding amount.

3. The gaming machine according to claim 1, wherein the payout-awarding control unit receives a transferred predetermined battle participation fee from the battle opponent when winning in the battle game, and enables the battle participation fee to be included in the some of the profits.

4. A gaming machine comprising:

a basic game execution unit, for executing a basic game;

a payout awarding unit, for awarding a payout on the basis of a game result of the basic game;

a battle game condition determination unit, for determining whether a battle game condition related to the payout is at least satisfied when a game result of the basic game corresponding to the payout occurs;

a battle opponent setting unit, for setting adjacent gaming terminals as battle opponents when it is determined that the battle game condition is satisfied;

a battle game execution unit, for executing a battle game in which the battle opponents compete to win when the battle opponents join the battle game;

a profit obtaining unit, for obtaining some profits when winning in the battle game that players join in as the battle opponents; and a battle game permitting unit, for randomly determining to permit or forbid to execute the battle game when the game result of the basic game corresponding to the payout occurs, and only when it is determined to permit, permitting to execute the battle game in the battle game execution unit.

5. The gaming machine according to claim 4, further comprising:

a battle game rejecting unit, for refusing to join in the battle game through an external operation when being set as a battle opponent.

6. The gaming machine according to claim 5, wherein the battle opponent setting unit has a battle opponent resetting unit for resetting the battle opponent to a preprogrammed computer when the battle opponent does not join the battle game.

7. The gaming machine according to claim 4, wherein the battle opponent setting unit has a battle opponent resetting unit for resetting the battle opponent to a preprogrammed computer when the battle opponent does not join the battle game.

8. A gaming machine comprising:

a basic game execution unit, for executing a basic game;

a payout awarding unit, for awarding a payout on the basis of a game result of the basic game;

a battle game condition determination unit, for determining whether a battle game condition related to the payout is at least satisfied when a game result of the basic game corresponding to the payout occurs;

a battle opponent setting unit, for setting adjacent gaming terminals as battle opponents when it is determined that the battle game condition is satisfied;

a battle game execution unit, for executing a battle game in which the battle opponents compete to win when the battle opponents join the battle game;

a profit obtaining unit, for obtaining some profits when winning in the battle game that players join in as the battle opponents; and a battle game rejecting unit, for refusing to join in the battle game through an external operation when being set as a battle opponent.

9. The gaming machine according to claim 8, wherein the battle opponent setting unit has a battle opponent resetting unit for resetting the battle opponent to a preprogrammed computer when the battle opponent does not join the battle game.

10. A gaming machine comprising:

a basic game execution unit, for executing a basic game;

a payout awarding unit, for awarding a payout on the basis of a game result of the basic game;

a battle game condition determination unit, for determining whether a battle game condition related to the payout is at least satisfied when a game result of the basic game corresponding to the payout occurs;

a battle opponent setting unit, for setting adjacent gaming terminals as battle opponents when it is determined that the battle game condition is satisfied;

a battle game execution unit, for executing a battle game in which the battle opponents compete to win when the battle opponents join the battle game;

a profit obtaining unit, for obtaining some profits when winning in the battle game that players join in as the battle opponents; and wherein the battle opponent setting unit has a battle opponent resetting unit for resetting the battle opponent to a preprogrammed computer when the battle opponent does not join the battle game.

11. A gaming machine, comprising:

a basic game execution unit, for executing a basic game;

a payout awarding unit, for awarding a payout on the basis of a game result of the basic game;

a battle game condition determination unit, for determining whether a battle game condition related to the payout is at least satisfied when a game result of the basic game corresponding to the payout occurs;

a battle opponent setting unit, for setting gaming terminals capable of data communication as battle opponents when it is determined that the battle game condition is satisfied;

a battle game execution unit, for executing the battle game that the battle opponents compete to win when the battle opponents are set;

a profit obtaining unit, for obtaining some profits when a player wins the battle game that players join as the battle opponents; and a payout-awarding control unit, for controlling the payout awarding unit in such a way that, when a player loses the battle game, the payout-awarding control unit transfers a part of the payout to a battle opponent and awards the player losing the battle game the remaining payout, wherein the profit obtaining unit enables the transferred part of the payout to be included in the some of the profits.

* * * * *